G. B. SMITH.
WIRE TWISTING CHUCK.
APPLICATION FILED AUG. 2, 1917.
1,367,632.
Patented Feb. 8, 1921.
2 SHEETS—SHEET 1.
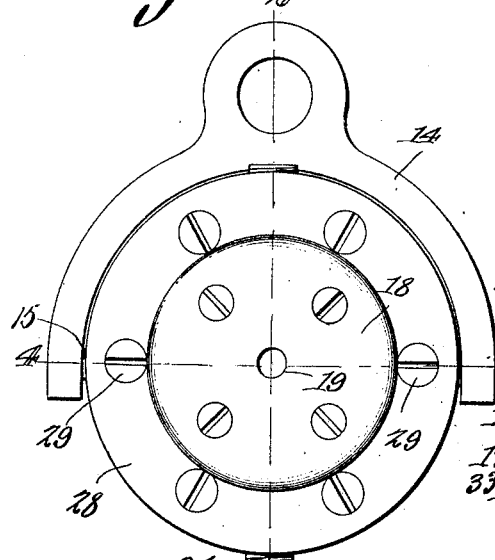
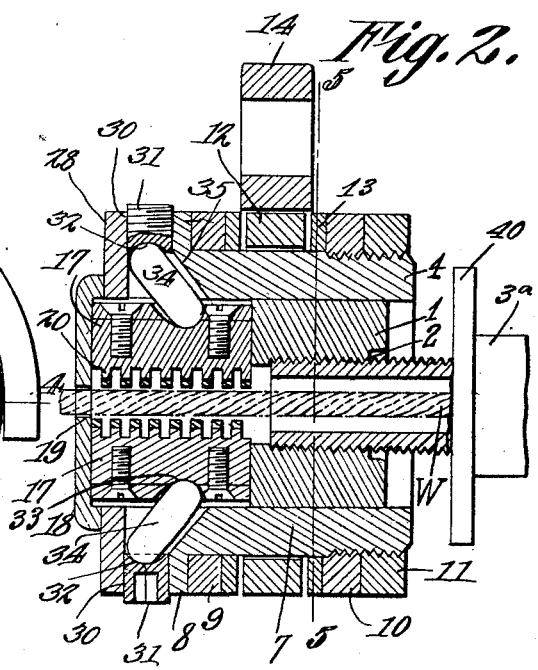
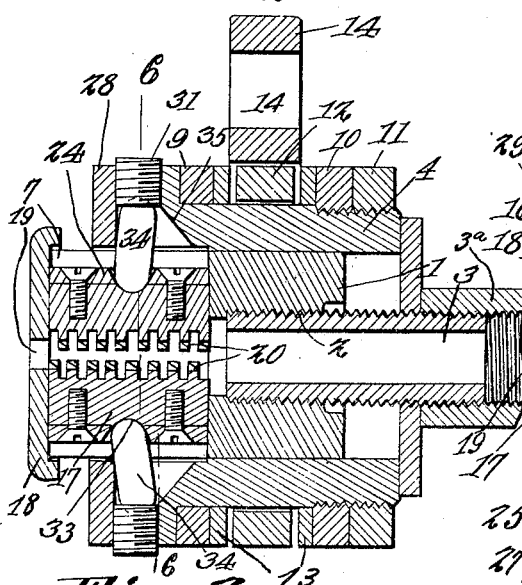
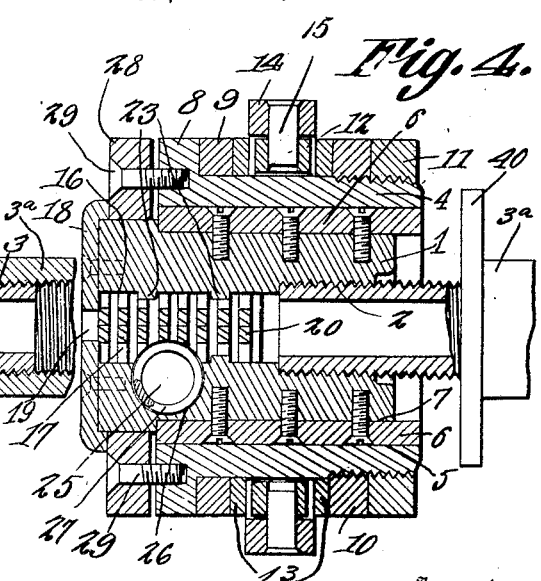
Inventor
G. B. Smith
By C. A. Snow & Co.
Attorneys.
Witness
J. R. Towley
H. A. Mitchell

G. B. SMITH.
WIRE TWISTING CHUCK.
APPLICATION FILED AUG. 2, 1917.

1,367,632.

Patented Feb. 8, 1921.
2 SHEETS—SHEET 2.

G. B. Smith, Inventor,

By C. A. Snow & Co.
Attorneys.

Witness

UNITED STATES PATENT OFFICE.

GARY B. SMITH, OF CHICAGO, ILLINOIS.

WIRE-TWISTING CHUCK.

1,367,632.   Specification of Letters Patent.   Patented Feb. 8, 1921.

Application filed August 2, 1917. Serial No. 184,085.

*To all whom it may concern:*

Be it known that I, GARY B. SMITH, a citizen of the United States, residing at Chicago, in the county of Cook and State of Illinois, have invented a new and useful Wire-Twisting Chuck, of which the following is a specification.

The present invention appertains to chucks, adapted especially for twisting wire, although useful for various other purposes, the present device being an improvement over the wire twisting chuck disclosed in my Patent No. 1,247,023, granted November 20, 1917.

It is the object of the invention to provide a novel and improved chuck having a quicker and more effective radial action of the gripping jaws, producing greater gripping power, a more desirable movement of the jaws to gripping and releasing positions, and other advantages to enhance the utility and efficiency of the chuck.

It is also the object of the invention to provide a chuck of the nature indicated which is comparatively simple, compact and durable, which is adjustable to grip objects of various diameters, within certain limits, according to the size of the device, which will effectively lock the jaws in gripping position, and which provides a thoroughly efficacious means for moving the jaws radially by the relative longitudinal movement of certain parts of the chuck.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein—

Figure 1 is a face or front view of the improved chuck.

Fig. 2 is a diametrical longitudinal section on the line 2—2 of Fig. 1, showing the jaws in releasing position.

Fig. 3 is a view similar to Fig. 2 showing the jaws in gripping position.

Fig. 4 is a longitudinal diametrical section taken on the line 4—4 of Fig. 1, in a plane at right angles to the line of section in Fig. 2.

Figure 5:
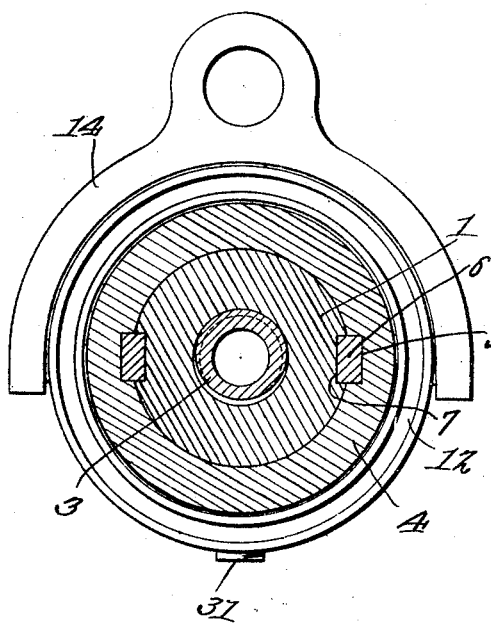
Fig. 5 is a cross section on the line 5—5 of Fig. 2.
Figure 6:
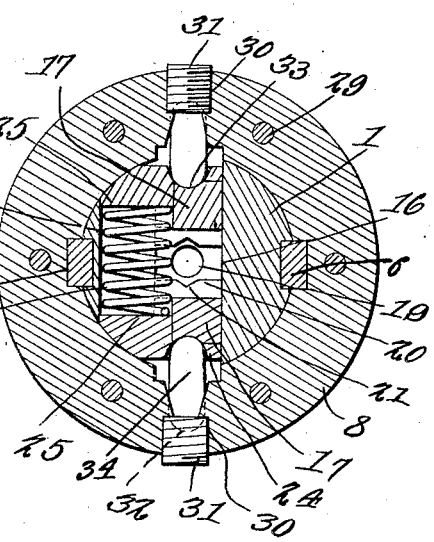
Fig. 6 is a cross section on the line 6—6 of Fig. 3.

The chuck embodies a tubular chuck member 1, the bore of which is threaded, as at 2, from one end to threadedly engage the tubular member 3 threaded into a tubular drive shaft $3^a$—this arrangement being preferably used when the chuck is employed on a wire twisting machine, for the passage of the twisted wire W through the chuck and shaft $3^a$, but when the chuck is used for other purposes, the chuck member 1 can be supported by any other suitable means in lieu of the tubular shaft $3^a$.

A sleeve or tubular actuating member 4 is slidable upon the chuck member 1 to actuate the jaws hereinafter described, and the sleeve 4 is made to rotate with the chuck member. Thus, as illustrated, the sleeve 4 is provided with diametrically opposite inner longitudinal grooves 5 extending from end to end in which are slidable longitudinal strips or feathers 6 secured by screws or otherwise in diametrically opposite longitudinal grooves 7 provided in the periphery of the chuck member 1. Thus, the chuck member and sleeve are slidable longitudinally relatively to one another, but are constrained to rotate together.

The means for shifting the sleeve 4 longitudinally is generally the same as that disclosed in the above mentioned application. The sleeve 4 is provided at that end opposite to the threaded end of the chuck member 1, with an outstanding annular flange or rib 8 against which is seated, a ring 9 fitted upon the sleeve 4. A ring or nut 10 is threaded onto the sleeve, and held in place by means of a lock nut 11 also threaded on the sleeve. A non-rotatable collar 12 is disposed between the rings 9 and 10, and said rings and collar have disposed therebetween washers 13 of suitable wear-resistive material to enable the sleeve 4 to rotate freely with respect to the collar 12, even when the collar is shifted longitudinally to move the sleeve with it.

The rings 9 and 10 and collar 12 can be of tool steel, whereby the sleeve 4 need not be of especially hard metal, for purpose of economy. A fork 14 straddles the collar 12, and is pivoted thereto by means of opposite trunnions 15. This fork 14 is used for shifting the sleeve back and forth. There is sufficient clearance between the parts so that the collar can stand clear of the washers in either position of the clutch to relieve said parts of undue strain and avoid friction except when the clutch is operated at intervals.

The chuck member 1 is provided with a diametrical opening 16 extending from that end thereof opposite to the internally threaded end, and a pair of opposite jaws 17 is slidable radially within the opening 16 toward one another to gripping position, and away from one another to releasing position. A disk 18 is fastened by screws or otherwise to the end of the chuck member 1 across the opening 16, to retain the jaws in place, and this disk 18 has a central aperture 19 for the passage of the wire W or other object to be gripped.

The jaws 17 are composed of blocks of hard metal, and their adjacent faces are provided with longitudinal series or rows of transversely spaced teeth 20, having the V-shaped notches 21 therein to grip or bite the wire or other object introduced between the jaws. Thus, when the jaws are forced under pressure into engagement with the wire or other object, the teeth 20 will tightly grip the wire and prevent slippage. The jaws 17 are provided at opposite sides thereof with grooves 22 engaging guide ribs 23 with which the chuck member 1 is provided at opposite sides of the opening 16, whereby to guide the jaws for radial movement.

The jaws have secured to their remote portions, by means of screws or otherwise, pieces 24 having laterally extending spring seats or ears 25 at one side slidable within a chordal bore 26 drilled in the chuck member 1 at one side of and opening into the opening 16. The bore 26 houses a coiled wire expansion spring 27 confined between the seats 25, whereby said spring has a tendency to separate the jaws and move them to releasing position.

A flat ring 28 is disposed adjacent to that end of the sleeve 4 having the flange 8, and clamping screws 29 extend through the ring 28 and are screwed into the sleeve 4 for drawing the ring 28 toward the sleeve. The adjacent portions of the sleeve 4 and ring 28 have drilled or tapped therein the threaded apertures or bores 30, extending radially. Adjusting screws 31 are threaded within the apertures 30 and their inner ends have concaved seats 32, while the pieces 24 and jaws 17 are provided with similar concaved seats 33 complementing the seats 32. Disposed between the seats 32 and 33 are hardened toggle members or struts 34 having rounded ends mounted in the seats, the sleeve 4 being cut away, as at 35, to accommodate said members 34, when their inner ends are swung away from the ring 28, as seen in Fig. 2.

The operation is as follows: When the sleeve 4 is moved to the left, as seen in Fig. 2, the outer ends of the toggle members 34 will be moved with the sleeve 4, being mounted in the seats 32, and this will break the toggle connection between the jaws and sleeve, permitting the spring 27 to quickly force the jaws apart to releasing position. The pieces 24 of the jaws can bear against the strips or feathers 6 when the jaws are moved apart, and the opening or clearance between the jaws will be sufficient to permit the wire or object W to move freely between the jaws. When the sleeve 4 is moved in the opposite direction, as seen in Fig. 3, the outer ends of the toggle members 34 are moved toward the right toward a common plane or line, thereby forcing the inner ends of the members 34 toward one another, and said members are thrust against the jaws, to force the jaws toward one another with considerable power, as accomplished by the toggle action. This will give the jaws great gripping power to grip the wire or other object W therebetween, and the outer ends of the members 34 are moved slightly beyond "dead center" or beyond a common line or plane thereof, as seen in Fig. 3, so that a lock is provided, to hold the jaws in gripping position until released, the toggle members 34 providing struts or props between the sleeve and jaws to prevent the separation of said jaws until the toggle is broken by the movement of the sleeve 4 to the position shown in Fig. 2. By the provision of the collar 12 and corresponding parts, the sleeve 4 can be shifted during the rotation of the chuck.

It will be noted that by adjusting the screws 31, this will adjust the jaws when in gripping position, to accommodate wire or other objects of various diameters within certain limits. The farther apart screws 31 are adjusted, the farther apart the jaws will be when in gripping position, and the more the screws 31 are adjusted toward one another, the more will the jaws be moved toward each other in gripping position. By tightening the screws 29, the screws 31 will be clamped tightly between the ring 28 and the sleeve 4, so that the screws 31 cannot rotate accidentally, it being necessary to loosen the screws 29 and ring 28 before the screws 31 can be turned. This provides an effective means for holding the screws 31 against accidental adjustment.

The disk 18 is of larger diameter than the opening in the ring 28, so that the disk contacts with said ring and serves as a stop to limit the movement of the sleeve 4 when it is moved forwardly, as seen in Fig. 2. A nut 40 is threaded on the tubular member 3 to provide a stop for limiting the movement of the sleeve 4, as seen in Fig. 3, when the toggle members 34 are moved to or slightly past dead center. The nut 40 also abuts against the end of the shaft $3^a$, to serve as a lock nut, and by adjusting the member 3 and shaft $3^a$ relatively, and adjusting the nut 40, the movement of the sleeve 4 to gripping position can be accurately adjusted, so that the toggle members 34 will effectively hold the jaws in gripping position, and prevent the toggle members 34 from moving too far. The position of the nut 40 is changed by first loosening said nut, and then turning the member 3 and shaft $3^a$ the desired amount, after which the nut 40 is again screwed back against the shaft $3^a$.

Figures 7, 8:
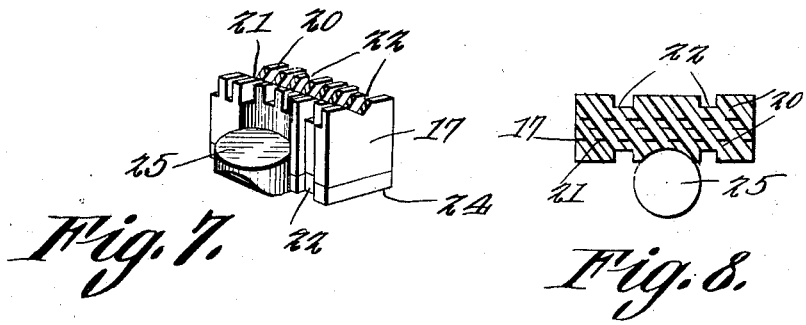
Fig. 7 is a perspective view of one of the gripping jaws.
Fig. 8 is a face view of a modified form of jaw.

It is preferable to thread the notches 21 of the jaw piece 20, so as to conform to the helical pitch of the twisted wire W, whereby when the jaws are moved into gripping engagement with the wire, the threaded or helically fluted pieces of the jaws will fit the twisted wire between the strands thereof, causing the wire to turn with the chuck, and eliminating clipping. This result can also be facilitated by setting the teeth 20 at an angle, as seen in Fig. 8, according to the pitch of the twisted wire, so as to engage the twisted wire between the strands thereof, to obtain a tight grip.

Having thus described the invention, what is claimed as new is:—

1. A chuck embodying a chuck member, jaws slidable radially in the chuck member, a sleeve slidable on the chuck member, a clamping member connected adjustably to the sleeve, adjustable members clamped between said clamping members and sleeve and capable of adjustment when the clamping member is loosened, and toggle members between said adjustable members and jaws.

2. A chuck embodying a chuck member, a sleeve slidable thereon, jaws slidable radially in the chuck member, a ring adjacent to one end of the sleeve, means for drawing said ring toward the sleeve, adjusting screws threaded and clamped between said sleeve and ring and capable of radial adjustment when the ring is loosened, and toggle members between said screws and jaws.

3. A chuck embodying a tubular member, a chuck member carried thereby, jaws slidable radially in the chuck member, a sleeve slidable on the chuck member, toggle members between said sleeve and jaws arranged to force the jaws inwardly when the sleeve is laid toward the tubular member, and an adjustable member on said tubular member serving as a stop for said sleeve.

4. A chuck embodying a tubular member, a chuck member carried thereby, jaws slidable radially in the chuck member, a sleeve slidable longitudinally on the chuck member, adjustable members carried by the sleeve, toggle members seated between said adjustable members and jaws, and arranged to force the jaws inwardly when the sleeve is slid toward said tubular member, said chuck member having a portion to limit the movement of the sleeve when slid away from the tubular member, and an adjustable member on the tubular member to limit the movement of said sleeve when moved toward the tubular member.

In testimony that I claim the foregoing as my own, I have hereto affixed my signature in the presence of two witnesses.

GARY B. SMITH.

Witnesses:
 Ivy E. Simpson,
 Monroe E. Miller.